US012799805B2

(12) United States Patent
McPhee

(10) Patent No.: US 12,799,805 B2
(45) Date of Patent: Nov. 17, 2026

(54) SCALABLE FIBER REINFORCED PLASTIC OVERHEAD DOOR ASSEMBLY

(71) Applicant: Brad McPhee, Garden, MI (US)

(72) Inventor: Brad McPhee, Garden, MI (US)

( * ) Notice: Subject to any disclaimer, the term of this patent is extended or adjusted under 35 U.S.C. 154(b) by 240 days.

(21) Appl. No.: 18/620,500

(22) Filed: Mar. 28, 2024

(65) Prior Publication Data

US 2024/0328240 A1 Oct. 3, 2024

Related U.S. Application Data

(60) Provisional application No. 63/455,150, filed on Mar. 28, 2023.

(51) Int. Cl.
*E06B 3/48* (2006.01)

(52) U.S. Cl.
CPC .................................... *E06B 3/485* (2013.01)

(58) Field of Classification Search
CPC ... E06B 3/486; E06B 5/10; E06B 3/48; E06B 3/86
See application file for complete search history.

(56) References Cited

U.S. PATENT DOCUMENTS

| | | | | |
|---|---|---|---|---|
| 3,703,061 A * | 11/1972 | Holland | E06B 3/485 | D25/48.4 |
| 6,062,293 A * | 5/2000 | Berger, Jr. | E06B 3/485 | 52/801.12 |
| 6,578,619 B2 * | 6/2003 | Wright | E05D 15/242 | 160/40 |
| 7,111,660 B2 * | 9/2006 | Hartmann | E06B 3/485 | 160/235 |
| 7,201,207 B2 * | 4/2007 | Colston | E05D 15/242 | 160/229.1 |
| 8,418,427 B2 * | 4/2013 | Strickland | E06B 3/822 | 52/404.3 |
| 11,788,344 B2 * | 10/2023 | Sanders | E06B 3/485 | 52/291 |
| 2009/0223131 A1 * | 9/2009 | Wiese | E06B 3/7001 | 49/506 |

* cited by examiner

*Primary Examiner* — Muhammad Ijaz
*Assistant Examiner* — Susan M. Heschel
(74) *Attorney, Agent, or Firm* — Device Patent LLC

(57) ABSTRACT

A scalable fiber reinforced plastic overhead door assembly (ODA) that maximizes strength and stiffness while minimizing weight utilizing engineered fiber reinforced plastic materials to fabricate panel assemblies. The overhead door assembly can function as a watertight access door to withstand extreme pressure from water on one side and can operate to open and close similar to a garage door utilizing multiple panel assemblies translatable along opposing rails. The panel assemblies are pivotably connected by a series of hinges. In one embodiment, the panel assemblies comprise an outer shell, an inner shell, a plurality of spar stiffeners, and a plurality of gusset stiffeners. The spar stiffeners can extend along the long length of the panel assembly. The shells and stiffeners are shaped to have an integrated fit and are joined by adhesive bonding at their intersections. In some embodiments, the hinges are aligned with end and/or gusset stiffeners.

20 Claims, 9 Drawing Sheets

SCALABLE FIBER REINFORCED PLASTIC OVERHEAD DOOR ASSEMBLY

CROSS REFERENCE TO RELATED APPLICATIONS

This application claims priority to Provisional Patent Application No. 63/455,150 filed Mar. 28, 2023, the entire disclosure of which is hereby incorporated by reference and relied upon.

BACKGROUND OF THE INVENTION

Field of the Invention

The invention relates generally to overhead door assemblies, and more particularly to overhead door assemblies constructed for maximizing strength and stiffness while minimizing weight.

Description of Related Art

Previous designs for overhead doors are manufactured typically of steel or aluminum. The components in these prior art doors are then either fastened or welded.

SUMMARY OF THE INVENTION

Disclosed herein is a scalable overhead door assembly that maximizes strength and stiffness while minimizing weight. Engineered FRP (fiber reinforced plastic) materials are used to fabricate panel assemblies used in the overhead door assembly using a novel design geometry of internal and external structures.

In one form, the overhead door assembly functions as a watertight access door capable of withstanding extreme pressure, with minimal deflection, and at a lowest possible weight.

In one form, the overhead door assembly withstands pressure generated by the blocking of a body of water on one side of the overhead door assembly.

In one form, the overhead door assembly operates like a garage door having multiple panel assemblies hinged together and traveling on a rail system.

In one form, internal and external structures of the panel assembly are fabricated using various fiber reinforcements and polymer resin systems.

In one form, an overhead door assembly comprises a plurality of panel assemblies (i.e. first panel assembly, second panel assembly, third panel assembly, etc.) that are pivotably connected by a series of hinges fastened to opposing long sides of each panel assembly.

In one form, the hinges in the overhead door assembly are butterfly hinges.

In one form, the overhead door assembly is constructed of panel assemblies of generally the same design, material, and construction.

In one form, the overhead door assembly comprises six panel assemblies hinged together.

In one form, the panel assemblies are predominantly constructed of fiber reinforced polymers (FRP).

In one form, the panel assembly comprises an outer shell.

In one form, the panel assembly comprises an inner shell.

In one form, the outer shell faces a water load in an operable mode wherein the overhead door assembly is lowered to is lowest position.

In one form, the overhead door assembly is elevated along rails from it lowest position to allow the passage of a water load.

In one form, the panel assembly comprises a plurality of spar stiffeners.

In one form, the panel assembly comprises a plurality of gusset stiffeners.

In one form, the gusset stiffeners are centrally located.

In one form, the gusset stiffeners are central gusset stiffeners having a substantially rectangular profile and type A and type B gusset stiffeners having a substantially triangular shape.

In one form, type A and type B gusset stiffeners have an opposing mirrored profile.

In one form, the spar stiffeners extend along the long length of the panel assembly.

In one form, an assembly of gusset stiffeners are aligned to span across the width (short length) of the panel assembly.

In one form, the inner shell and outer shell mate to define an internal space.

In one form, the internal space has a cross-section that is substantially an isosceles trapezoid.

In one form, encapsulated within the internal space are spar stiffeners and the various gusset stiffeners.

In one form, the inner shell and outer shell, the spar stiffeners and the gusset stiffeners, are shaped to have an integrated fit and are joined by adhesive bonding at their intersections.

In one form, individual panel assemblies are joined using hinges to create the overhead door assembly.

In one form, the hinges are butterfly hinges.

In one form, the overhead door assembly is impervious to corrosion due to the use of non-corrosive materials.

In one form, position, quantity, and shape of FRP (fiber reinforce polymer) components in the panel assemblies can be modified to optimize for specific design or performance criteria.

In one form, hinge location and quantities of hinges used in the overhead door assembly can be altered based on loading and size requirements. In addition, hinge materials may be altered to provide more strength, reduce weight, vary corrosion resistance, as well as adjust other design factors.

In one form, the hinges are aligned with an assembly of end gusset stiffeners within the panel assembly.

In one form, the hinges are aligned with an assembly of end gusset stiffeners and central gusset stiffeners.

In one form, the hinges are butterfly hinges.

In one form, various forms of backup plates are utilized to reinforce the hinges.

In one form, the backup plates comprise threaded holes that align with fixation holes in the hinges to secure the hinges using fasteners to the inner shell and outer shell.

In one form, portions of the inner shell and outer shell are fixed between the hinges and backup plates.

In one form, the design of the overhead door assembly is approximately 10% of the weight of prior art designs providing equivalent or improved performance. This results in lighter and less expensive ancillary and support equipment needed for door operation. The scalability of the overhead door assembly results in overall weight savings of tens of thousands of pounds per overhead door opening for larger applications.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Figure 34:
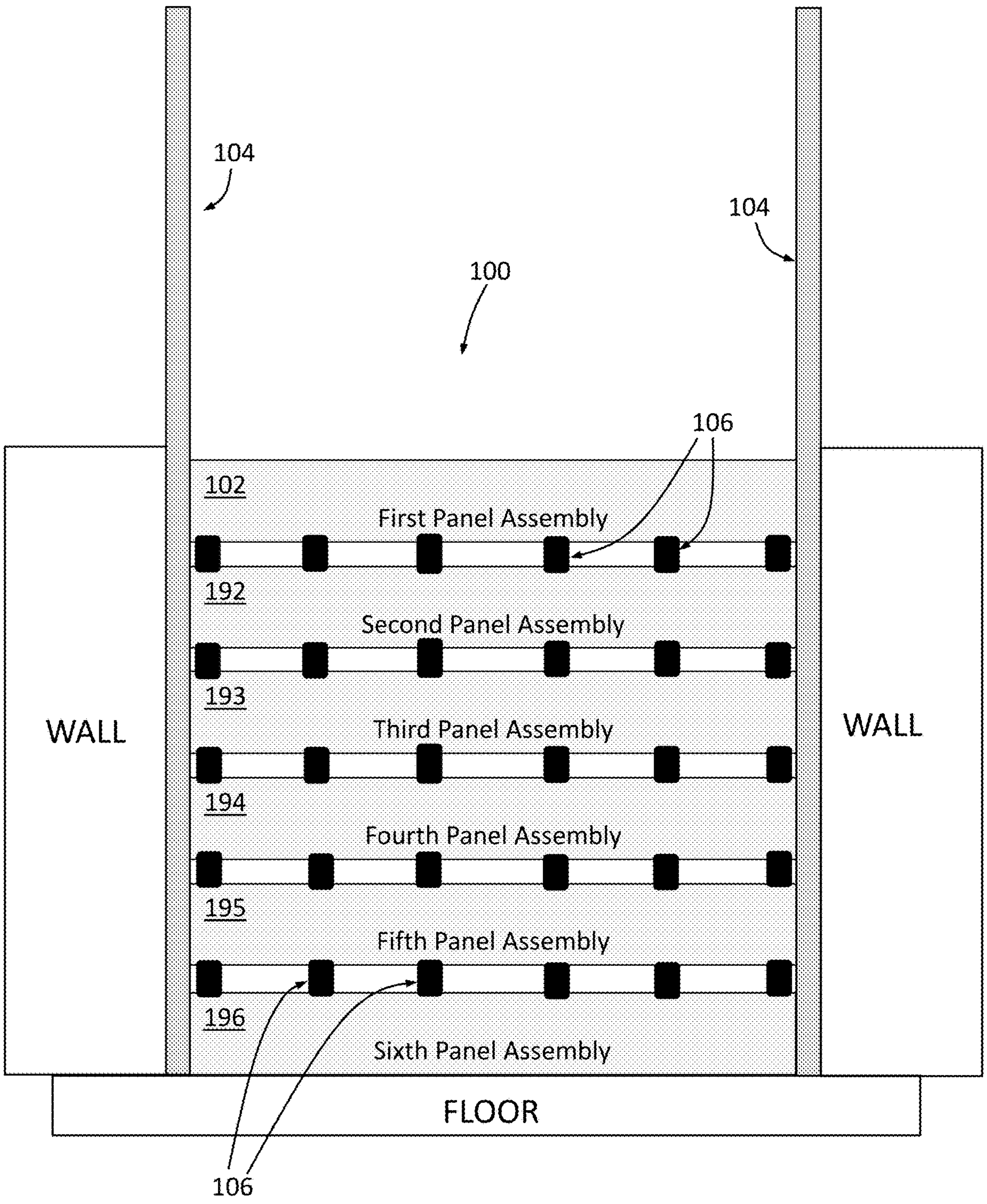
FIG. 34 is a graphic depicting an overhead door assembly mounted within a rail system between opposing walls and a floor.

Disclosed herein is a scalable overhead door assembly 100 that maximizes strength and stiffness while minimizing weight. Engineered FRP (fiber reinforced polymer) materials are used to fabricate a plurality of panel assemblies used in the overhead door assembly 100 using a novel design geometry of internal and external structures. The quantity and size of panel assemblies utilized in the overhead door assembly 100, can vary based on variable design requirements. In preferred embodiments, the panel assemblies have: generally the same design, use the same materials, and have the same construction. FIG. 34 for example, depicts one embodiment of an overhead door assembly 100 having six panel assemblies (i.e. first panel assembly 102, second panel assembly 192, third panel assembly 193, fourth panel assembly 194, fifth panel assembly 195, and sixth panel assembly 196). The panel assemblies are secured to each other by hinges 106 which in this case are in the form of butterfly hinges spaced along a long side (long end) of the panel assemblies and whereby the hinges extend from one panel assembly to the other to provide articulation therebetween. The short side (short end) of the panel assemblies are movably coupled to a rail system 104 that provides a track for the overhead door assembly 100 to move up and down to allow or block the flow of water from behind a fluid containing structure such as a wall and floor. The overhead door assembly serves as a watertight access door by the blocking of a body of water on one side of the overhead door assembly and is capable of withstanding extreme pressure, with minimal deflection, and at a lowest possible weight. In some embodiments, the overhead door assembly is used on the side of a ship as a closable port of entry. In some ways, the overhead door assembly operates like a garage door having multiple panel assemblies hinged together and traveling on a rail system 104. The overhead door assembly 100 in preferred embodiments is constructed predominantly of fiber reinforced plastic materials.

Figure 1:
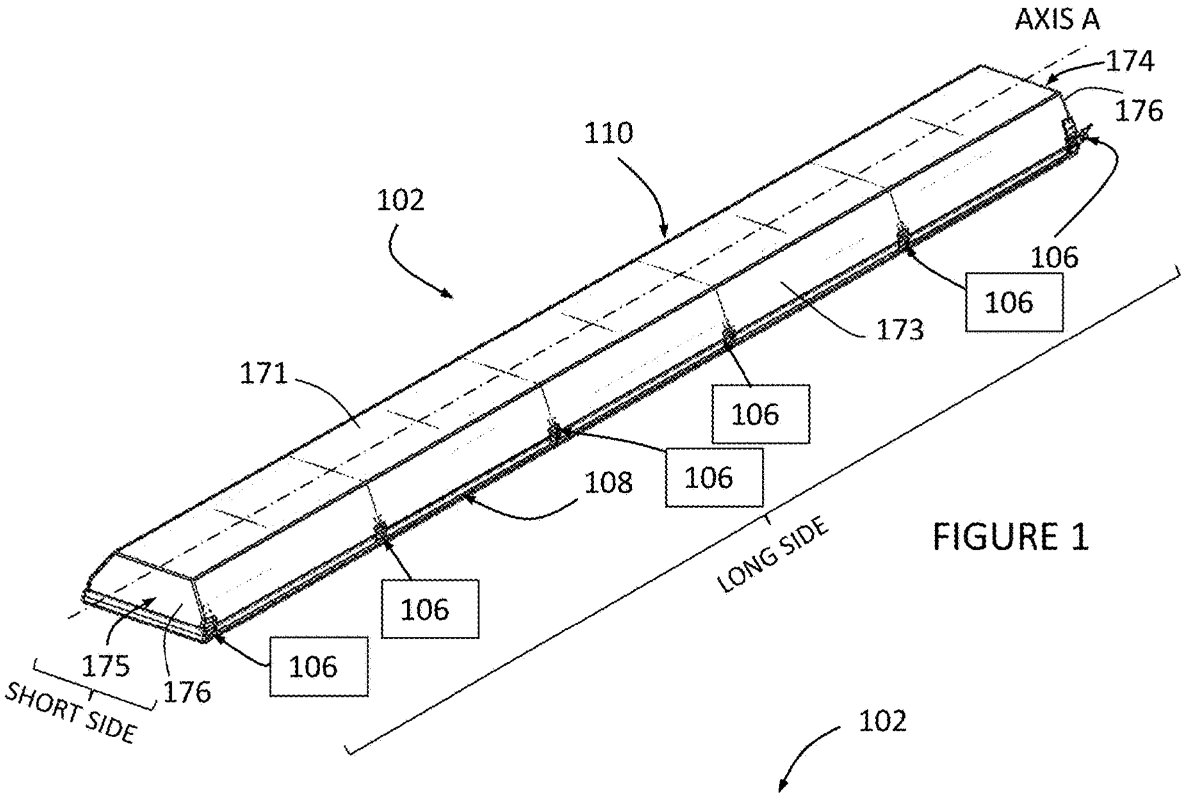
FIG. 1 depicts a perspective view of a panel assembly.
Figure 2:
FIG. 2 depicts a side view of the panel assembly of FIG. 1.
Figure 3:
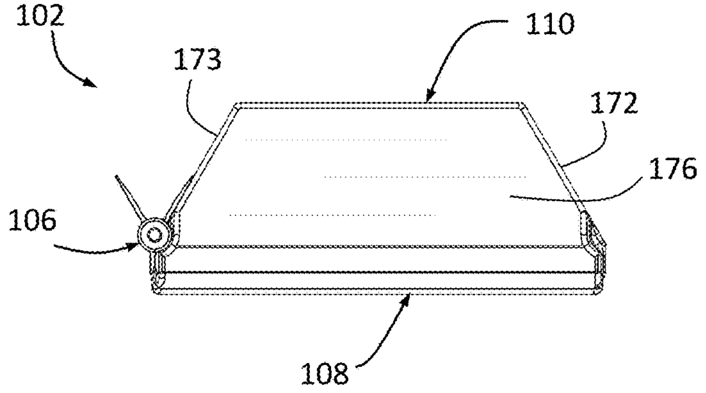
FIG. 3 depicts an end view of the panel assembly of FIG. 1.
Figure 4:
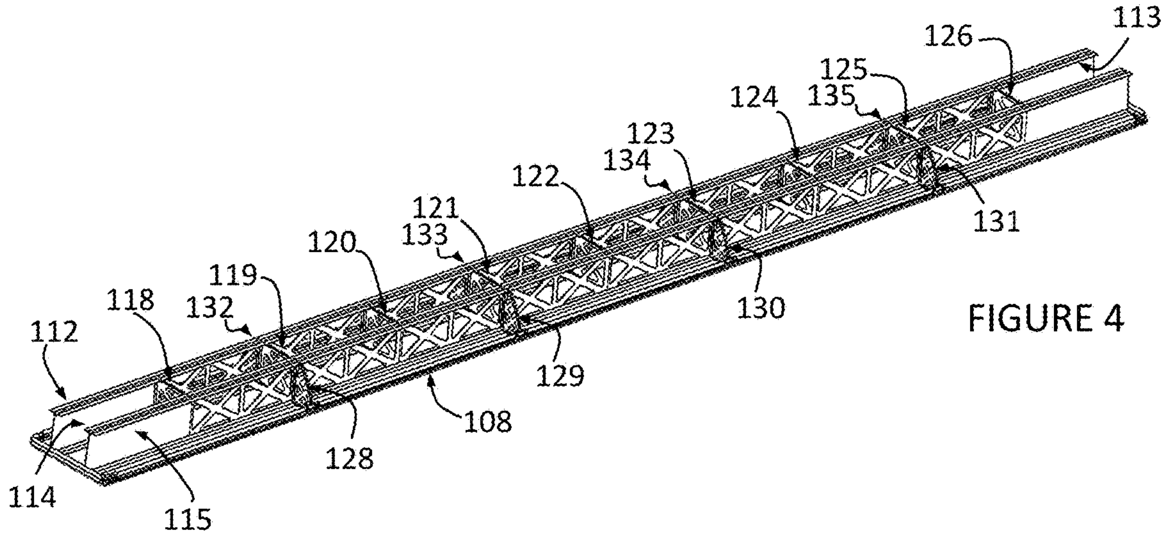
FIG. 4 depicts a top perspective view of the panel assembly of FIG. 1 with inner shell removed.
Figure 8:
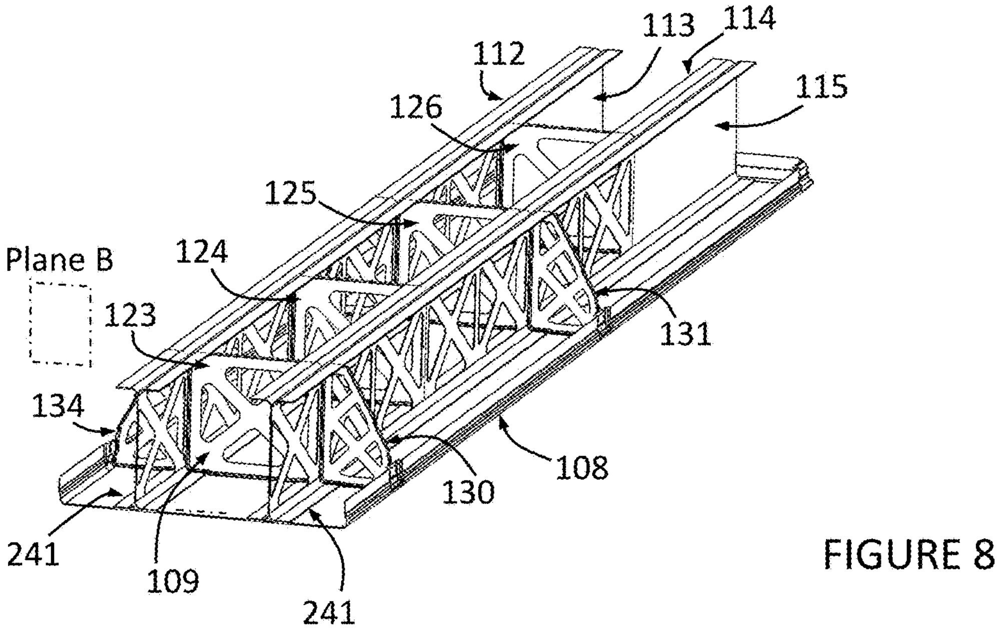
FIG. 8 depicts a partial perspective section view of a panel assembly with inner shell removed.
Figure 9:
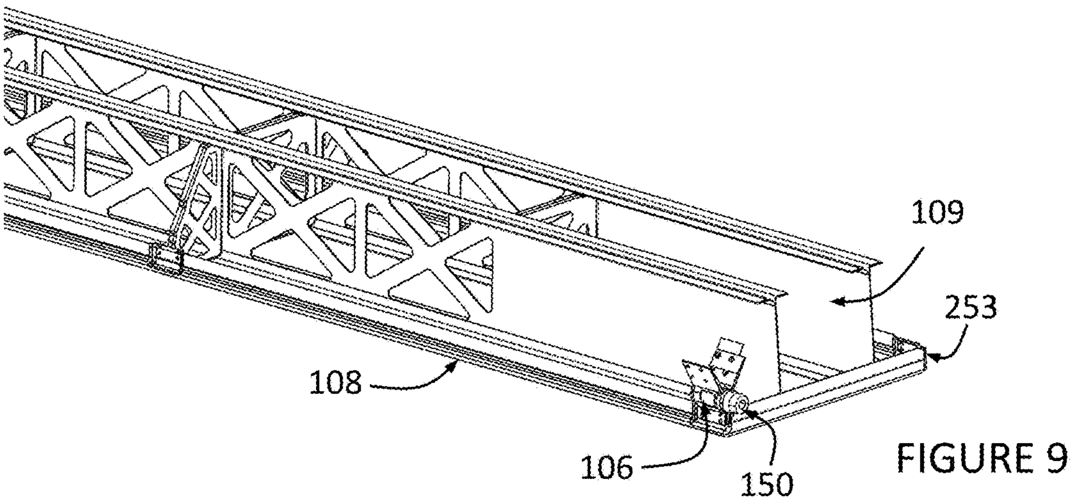
FIG. 9 depicts a partial perspective view of a panel assembly with inner shell removed.

FIG. 1 depicts one embodiment of a sample first panel assembly 102 which again in most cases is replicated by other panel assemblies in an overhead door assembly 100. Here, first panel assembly is elongate along central axis A. FIG. 2 depicts a side view of the first panel assembly whereas FIG. 3 is an end view of the first panel assembly 102. The first panel assembly is depicted here with a single hinge, however in this embodiment, there are a total of six hinges spaced across the visible long side and another six on the opposite long side. The first panel assembly 102 comprises an outer shell 108 and an inner shell 110 that mate together to define an internal space 109 within the shells that encapsulate the internal stiffeners. Situated within the internal space 109 (FIG. 9), is a plurality of spar stiffeners (FIG. 8-10) which generally extend the long length of the panel assembly within internal space 109. Four spar stiffeners (FIGS. 4,8-9, inner shell removed, and FIGS. 11-14) are illustrated here (first spar stiffener 112, second spar stiffener 113, third spar stiffener 114, fourth spar stiffener 115, etc.) which again can vary in quantity depending on the demands of the panel assembly. In this case, the spar stiffeners are spaced in pairs wherein the C-wall (C-shaped) on each pair is positioned back-to-back as noted in FIGS. 8 and 9 such that the flanges on each spar stiffener faces away from the flanges on the opposing mating spar stiffener.

FIGS. 4, and 8-10 also depict an embodiment whereby the panel assembly comprises a plurality of gusset stiffeners. Positioned centrally between and generally perpendicular to the spaced pairs of spar stiffeners are central gusset stiffeners 217 (labeled here as first central gusset stiffener 118, second central gusset stiffener 119, third central gusset stiffener 120, fourth central gusset stiffener 121, fifth central gusset stiffener 122, sixth central gusset stiffener 123, seventh central gusset stiffener 124, eighth central gusset stiffener 125, and ninth central gusset stiffener 126, etc.). FIGS. 4, and 8-10 also depict end gusset stiffeners 229 of type A end gusset stiffeners and type B end gusset stiffeners which can be referred to herein more simply as type A gusset stiffeners, and type B gusset stiffeners (i.e. first type A gusset stiffener 128, second type A gusset stiffener 129, third type A gusset stiffener 130, fourth type A gusset stiffener 131, first type B gusset stiffener 132, second type B gusset stiffener 133, third type B gusset stiffener, fourth type B gusset stiffener, etc.). As will be described in further detail later, the type B gusset stiffeners have opposite forms (i.e. gusset rim extends in an opposite direction) but are otherwise the same as type A gusset stiffeners. As noted in FIG. 8, the type A gusset stiffeners and the type B gusset stiffeners are substantially aligned in a single plane (plane B) on either side of the paired spar stiffeners and with a central gusset stiffener generally positioned also in plane B between the spaced pair of spar stiffeners. As depicted here, the assembly of central gusset stiffeners and type A and type B gusset stiffeners are generally aligned to span across the width of the panel assembly.

Figure 10:
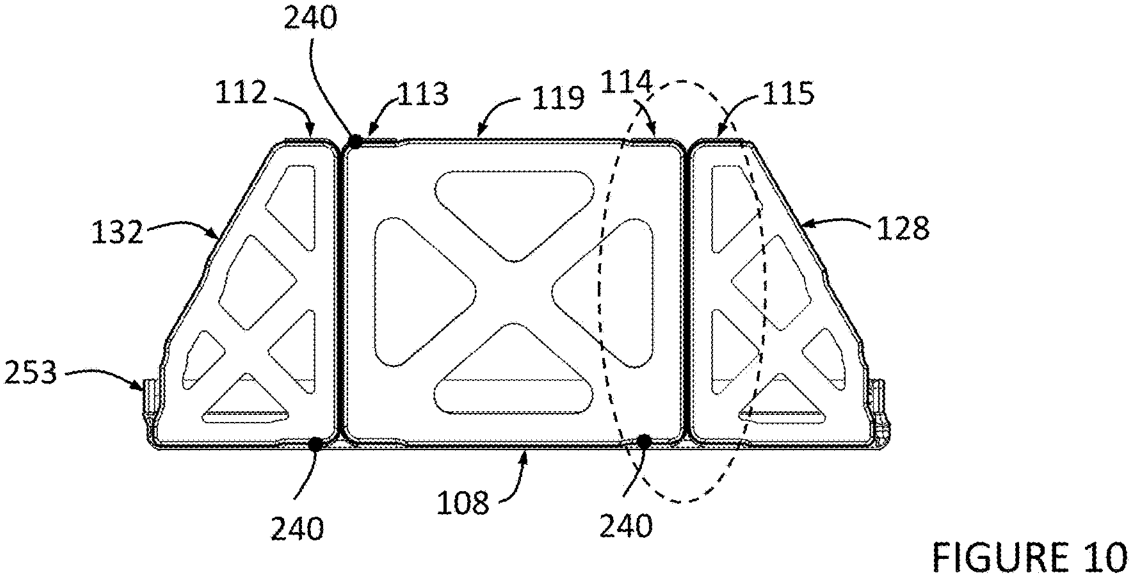
FIG. 10 depicts a sectional end view of a panel assembly with inner shell removed.
Figure 11:
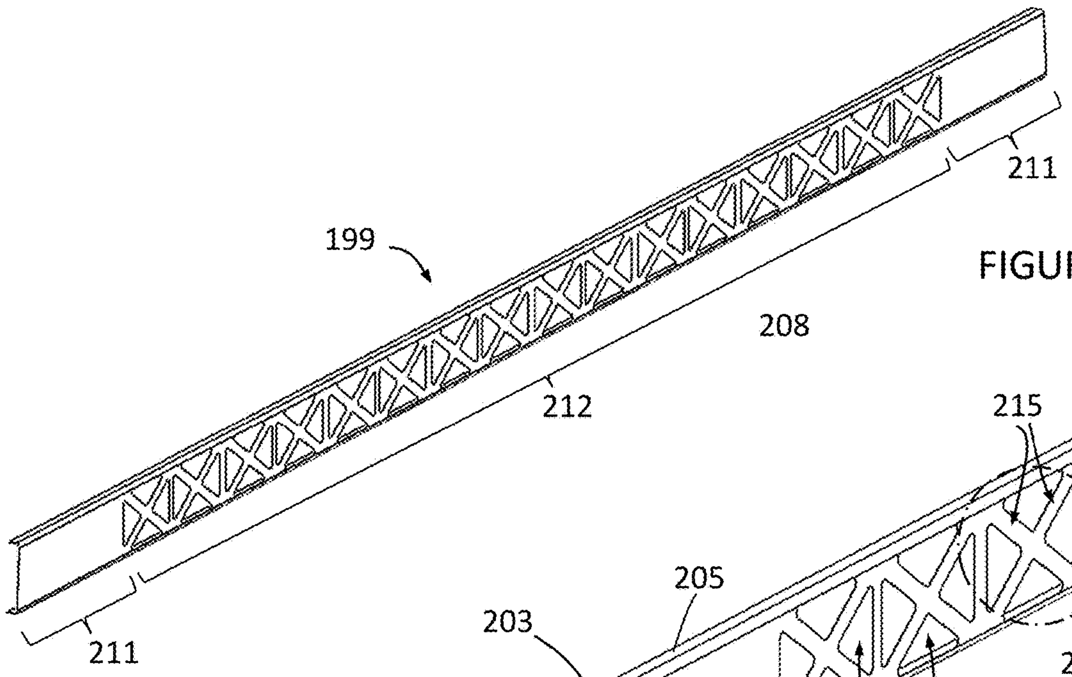
FIG. 11 depicts a perspective view of a spar stiffener.
Figure 12:
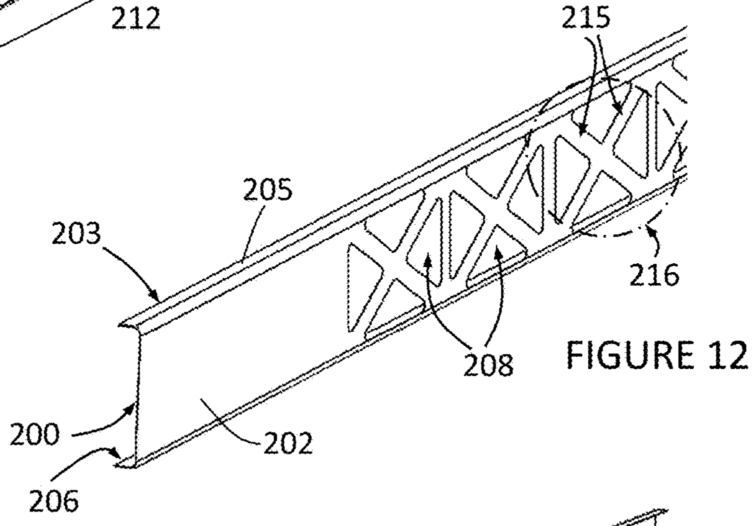
FIG. 12 depicts a closeup partial perspective view of the spar stiffener of FIG. 11.
Figure 13:
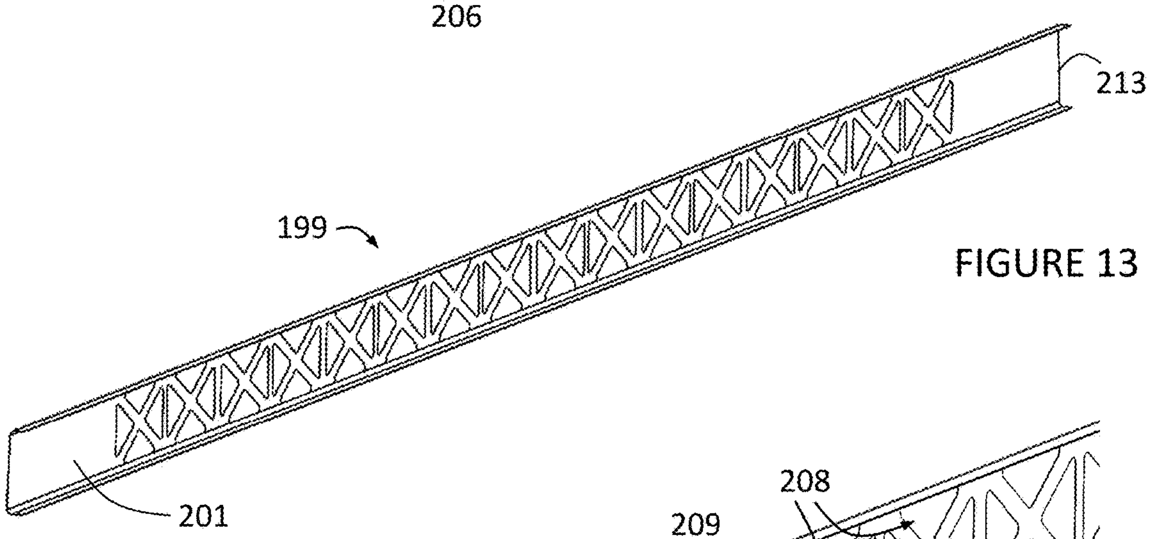
FIG. 13 depicts the opposing side of the spar stiffener of FIG. 11.
Figure 14:
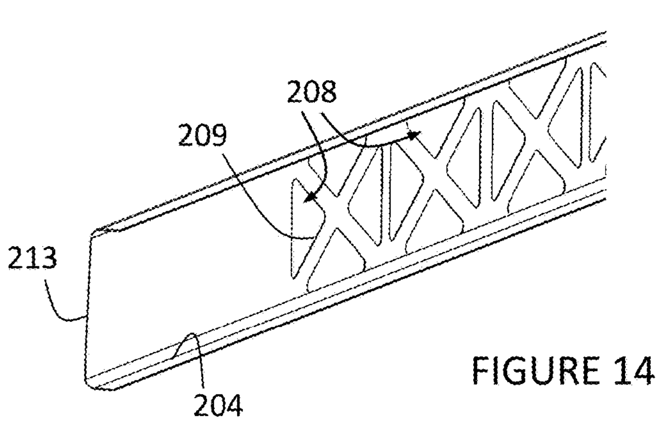
FIG. 14 depicts a closeup partial perspective view of the spar stiffener of FIG. 13.

As noted as just one example in FIG. 10, (depicted with inner shell removed), the inner shell and outer shell 108, spar stiffeners and the gusset stiffeners are shaped to have an integrated fit and are joined by adhesive bonding 240 at a variety of intersection locations between the components. Two examples of potential locations of adhesive bonding 240 are depicted in FIG. 10, however, adhesive bonding can occur at numerous other intersection locations throughout the panel assemblies. As noted in the FIG. 10 embodiment, the back to back C-shaped spar stiffeners form an I-beam type construction that extends between the outer shell and inner shell (note dashed oval in FIG. 10).

FIG. 34 further depicts an overhead door assembly 100 whereby individual panel assemblies are joined using hinges 106 to create the overhead door assembly 100. Hinge location and quantities of hinges used in the overhead door assembly can be altered based on loading and size requirements. In addition, hinge materials may be altered to provide more strength, reduce weight, vary corrosion resistance, as well as adjust other design factors.

In this embodiment, hinges 106 distributed along the center of the long sides of the panel assembly are aligned with an assembly of end gusset stiffeners located within the internal space 109 for additional strength at these points. Here, the hinges 106 are in the form of butterfly hinges which use various forms of backup plates to reinforce the hinges. The hinges 106 (FIGS. 22-28) comprise a female wing assembly 150 which mates with a male wing assembly 164 and are secured with a pivot pin 160 that has an enlarged pivot head 161 and a pin lock 162 at an opposed end to secure the pin in place within the pivot core 153. The female wing assembly 150 comprises a long wing 151 which is generally in an enlarged plate form, opposed by a short wing 152 which is generally in a smaller plate form. A pair of spaced mate rings 163 join the short wings and the long wings. As depicted here, the long and short wing extend radially from the mate rings. Defined between the mate rings 163 is a mate hole 155 sized for receiving a mate boss 159 of a male wing assembly 164 between opposing mate hole faces 156 on the opposed mate rings 163. A pivot hole face 154 is circular and extends through the mate rings 163 and mate boss 159 to define a pivot core 153 in which pivot pin 160 resides when the hinge is assembled.

Long wing fixation holes 157 extend through the long wings 151, and short wing fixation holes 158 extend through the short wings 152 of hinge 106. The male wing assembly 164 comprises a long wing 151 which is generally in an enlarged plate form and is opposed by a short wing 152 which is generally in a smaller plate form. In this embodiment, the long wing fixation holes 157 are aligned in assembly with hinge inner locator holes 188 and fastened against the first outer non-parallel face 172 or the second outer non-parallel face 173 of the inner shell 110. The short wings 152 are fastened against the hinge pocket face 187 in the hinge pockets 186 of the inner shell 110 at the inner shell rim 181 with hinge fasteners 168 extending through the hinge outer locator holes 189. A long adhesive gasket 166 can be used to bond the inner shell 110 and the broad faces of the long wings 151, and a short adhesive gasket 167 can be used to bond the inner shell 110 with the broad faces of the short wings 152.

Figure 29:
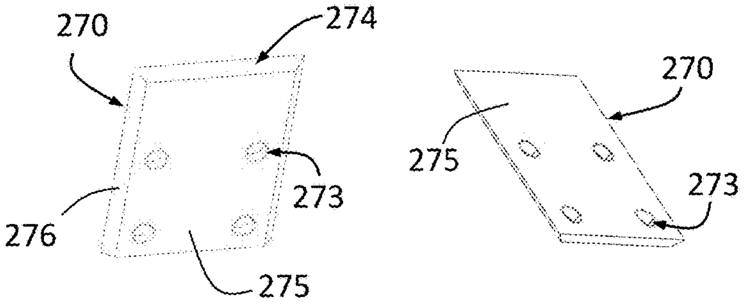
FIG. 29 depicts perspective views of backup plates.
Figure 30:
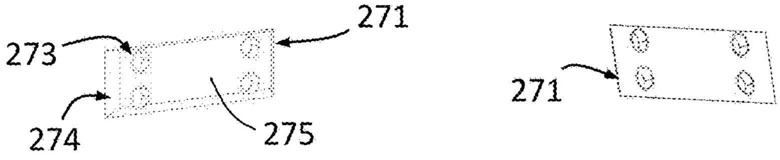
FIG. 30 depicts perspective views of backup plates.
Figure 31:
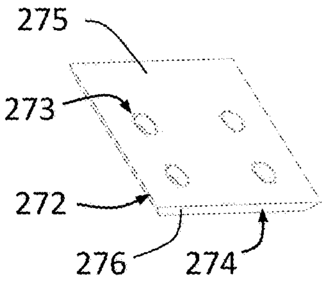
FIG. 31 depicts a perspective view of a backup plate.

Backup plates are aligned on the inside of the inner shell 110 and outer shell 108, with the long wing and short wing fixation holes. Threaded hinge fasteners 168 extend through the long wing fixation holes 157 and short wing fixation holes 158 into backup plate threaded holes 273 that align with the fixation holes in the wings to secure the hinges in place. FIGS. 29-31 depict an example of various sizes and forms of backup plates (i.e. end hinge backup plate 270, hinge edge backup plate 271, mid hinge backup plate 272) although other sizes can be utilized. The backup plates depicted here comprise a pair of opposed broad faces 275, backup plate threaded holes 273, an edge face 276, and in some embodiments the edge face is in the form of a chamfered edge 274.

Figure 5:
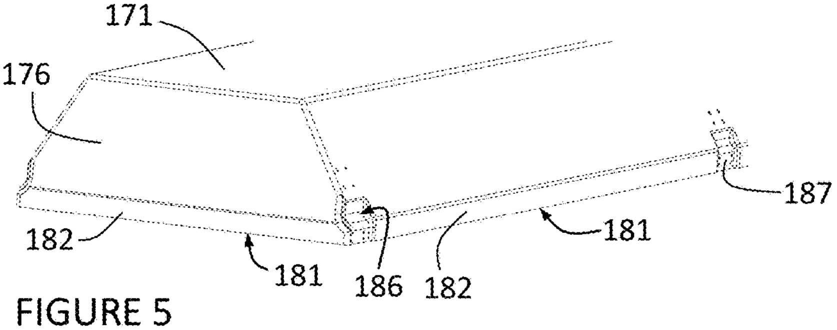
FIG. 5 depicts a top partial end perspective view of an inner shell.
Figure 6:
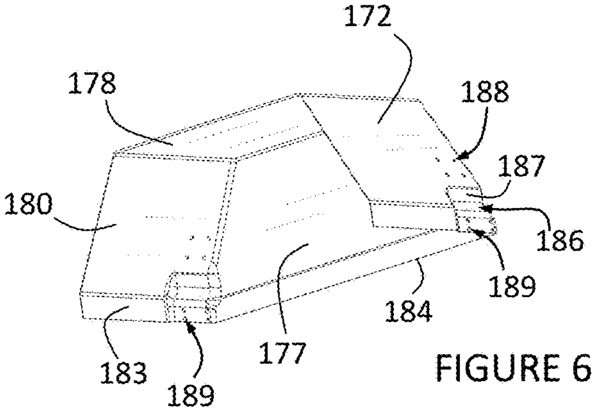
FIG. 6 depicts a bottom partial end perspective view of an inner shell.
Figure 7:
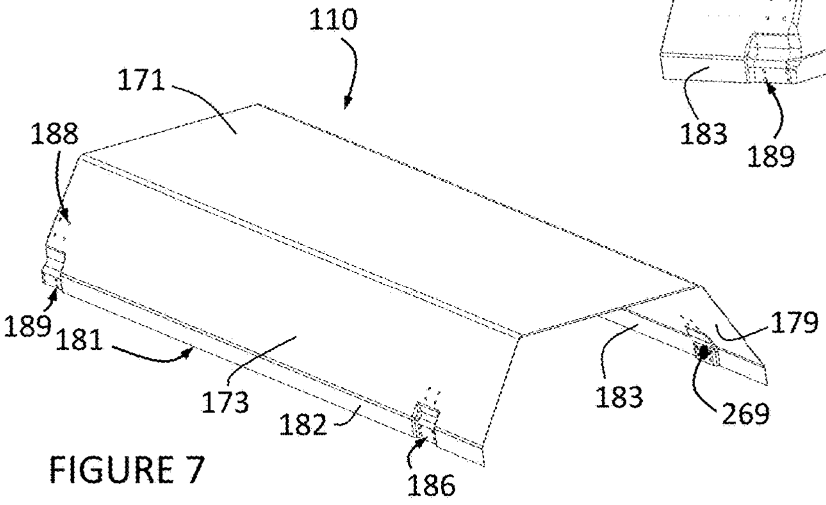
FIG. 7 depicts a top partial perspective view of an inner shell.

Portions of one embodiment of the inner shell 110 are further depicted in FIGS. 5-7. FIG. 5 is a partial perspective view depicting a generally isosceles trapezoid wall profile, including an outer face 171 facing outward from the internal space 109 that is positioned between a sloping outward facing first outer non-parallel face 172 and, a sloping outward second outer non-parallel face 173. A first end cap 174 integral with the inner shell encloses the wall profile on one end, whereas, a second end cap 175 (FIG. 1) also integral with the inner shell encloses the wall profile on the other end. Directly opposite the first outer non-parallel face 172 is inner facing first inner non-parallel face 179, and directly opposite the second outer non-parallel face 173 is inner facing second inner non-parallel face 180. Opposite the outer face 171, is inner face 178 facing inside. At the end caps, an outer end cap face 176 faces outward, whereas an inner end cap face 177 faces inward. An inner shell rim 181 projects outward from the generally isosceles trapezoid wall profile. The inner shell rim 181 comprises a rim outer face

182 facing outward, and a rim inner face 183 facing inward. A rim end face 184 spans between the rim outer face 182 and rim inner face 183.

The spar stiffeners in this embodiment are depicted in FIGS. 11-14. They have a C-wall 200 having a shallow C-shape profile. The middle of the C-shape profile is substantially planar until it intersects with a first flange 203 on one long side of the spar stiffener, and a second flange 206 on an opposing long side of the spar stiffener. The middle of the C-wall has a generally flat inner C-wall face 201 facing the inside of the C, and a generally flat opposed outer C-wall face 202 facing the outside of the C. Both the first flange 203 and the second flange 206 have an interior flange face 204 facing the inside of the C, and an exterior flange face 205 facing the outside of the C. The spar stiffeners include a light section 212 that has a plurality of C-wall windows 208 defined by a C-wall window face 209 extending therethrough, and a heavy section 211 that is absent of C-wall windows. Each long end of the spar stiffener terminates in a C-wall end face 213 that here is generally perpendicular to the first and second flange. The light section 212 comprises a plurality of C-wall windows 208 which in this embodiment are in the form of rounded triangles. The C-wall windows here are organized in square shaped pattern defining a remaining plurality of diagonal struts 215 forming a cross strut 216.

Figure 17:
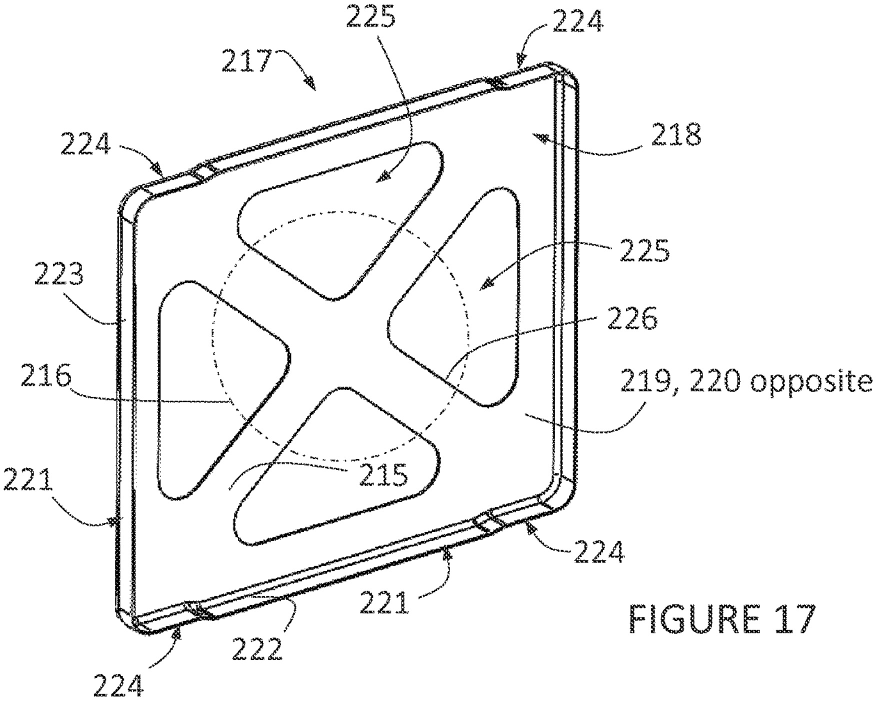
FIG. 17 depicts a perspective view of a central gusset stiffener.
Figure 18:
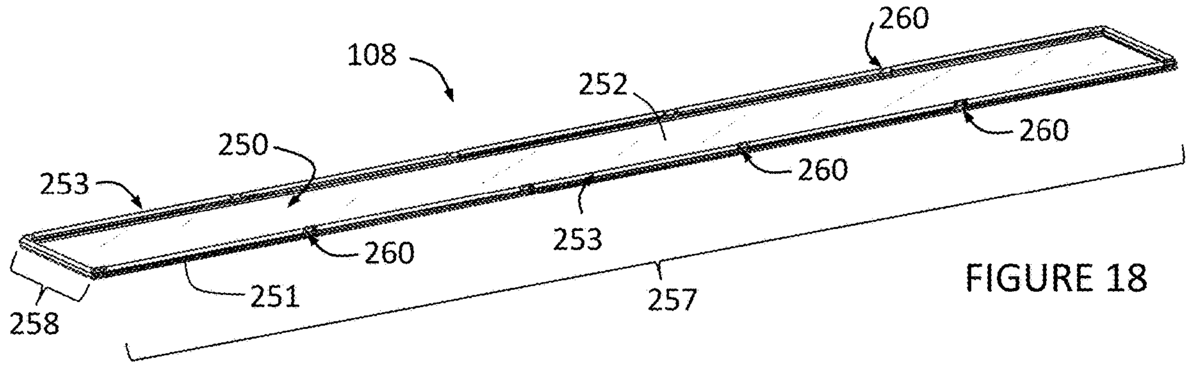
FIG. 18 depicts a perspective view of an outer shell of a panel assembly.
Figure 19:
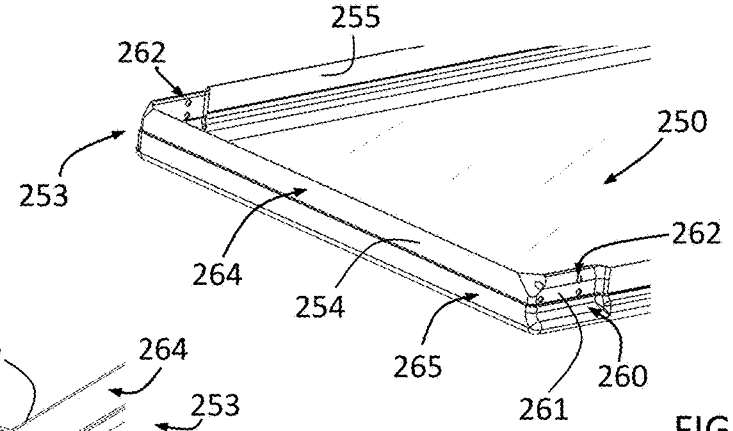
FIG. 19 depicts a partial closeup view of the outer shell of FIG. 18.
Figure 20:
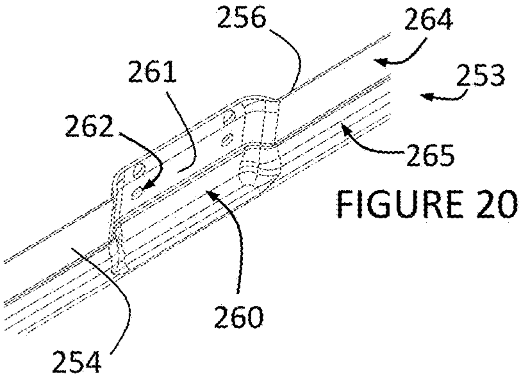
FIG. 20 depicts a partial closeup perspective view of a hinge recess of the outer shell of FIG. 18.
Figure 21:
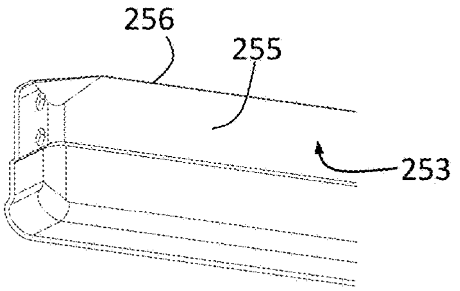
FIG. 21 depicts a partial perspective view of an outer shell brim.
Figure 22:
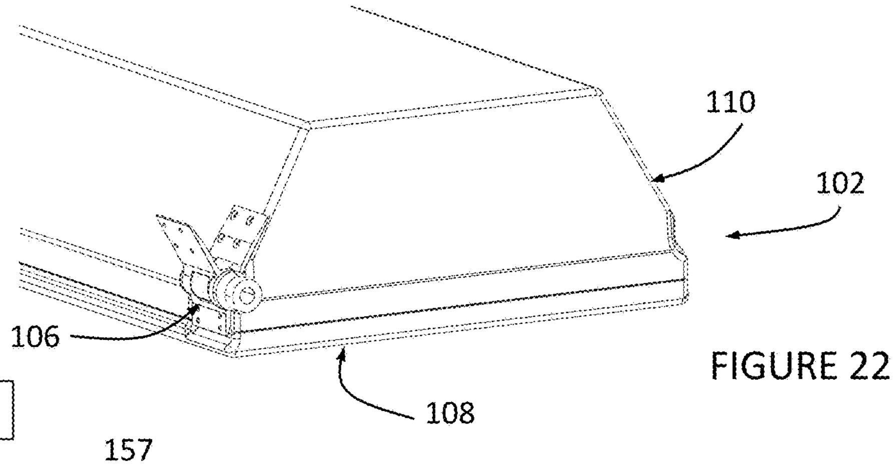
FIG. 22 depicts a partial end view of a panel assembly.
Figure 23:
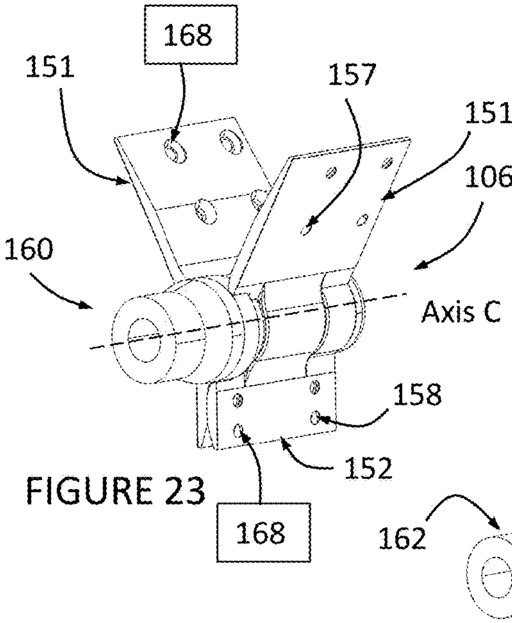
FIG. 23 depicts a perspective view of a butterfly hinge.
Figure 24:
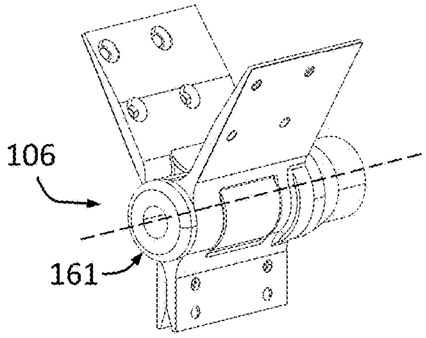
FIG. 24 depicts the opposing perspective view of the butterfly hinge of FIG. 23.
Figure 25:
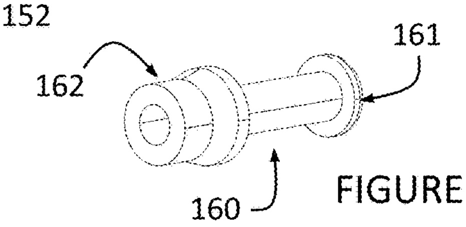
FIG. 25 depicts a perspective view of a pivot pin utilized in the butterfly hinge of FIG. 23-24.
Figure 26:
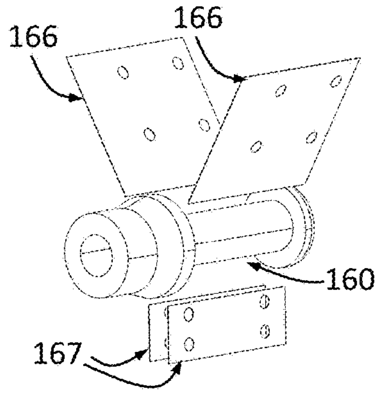
FIG. 26 depicts an abstract perspective view of a butterfly hinge absent of mating rings.
Figure 27:
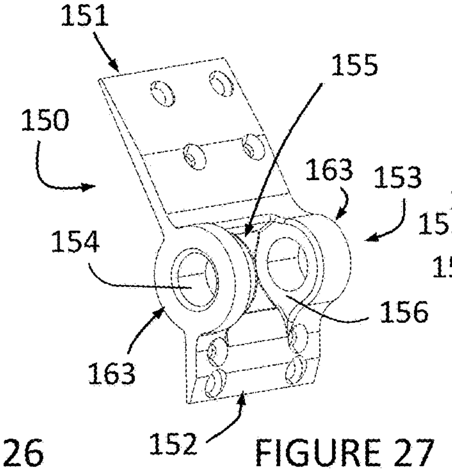
FIG. 27 depicts a perspective view of the female portion of a butterfly hinge.
Figure 28:
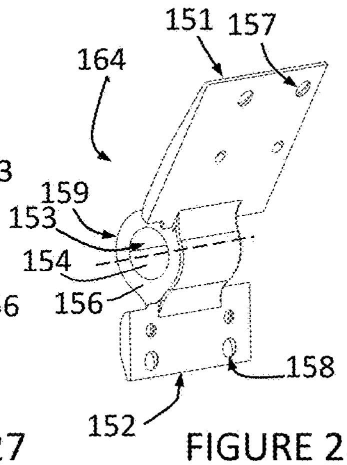
FIG. 28 depicts a perspective view of the male portion of a butterfly hinge.

FIG. 17 depicts one embodiment of a central gusset stiffener 217. The central gusset stiffener 217 is in the form of a generally rectangular plate (here substantially square) but could assume other profiles. It has a broad generally planar central gusset wall 218 having a gusset rim 221 extending from the perimeter of the central gusset wall 218. On the 'cupped' side, the central gusset wall has an outward facing inner gusset surface 219 with an opposing outer gusset surface 220 on the other side of the central gusset wall. An inner rim surface 222 is on a cupped facing side of the gusset rim 221 with an opposing outer rim surface 223 on the other side of the gusset rim. Inset at various locations within gusset rim 221 are a plurality of interlock steps 224 that are depressions configured to interface with portions of other stiffeners and shells. A central gusset window face 226 defines a plurality of central gusset windows 225 which here are in the form of rounded triangles that define a plurality of diagonal struts 215 and cross struts 216 through the part.

Figure 15:
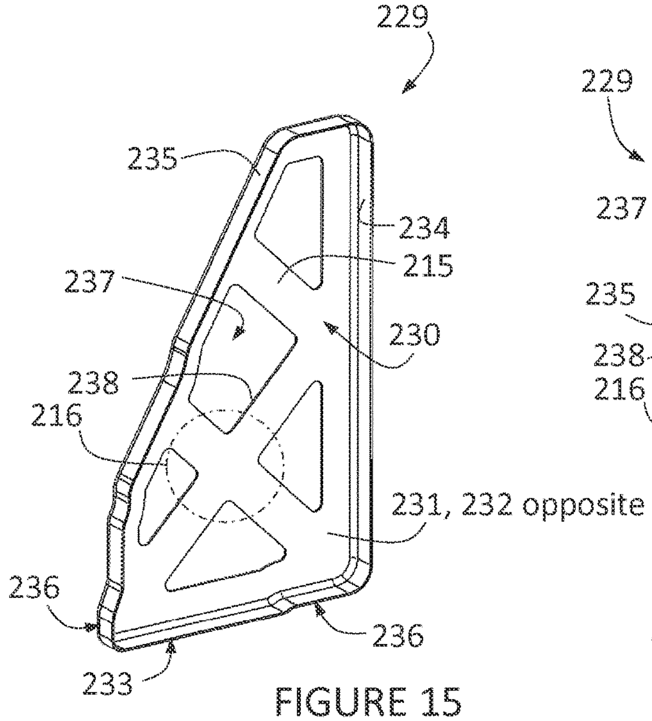
FIG. 15 depicts a perspective view of an end gusset stiffener.
Figure 16:
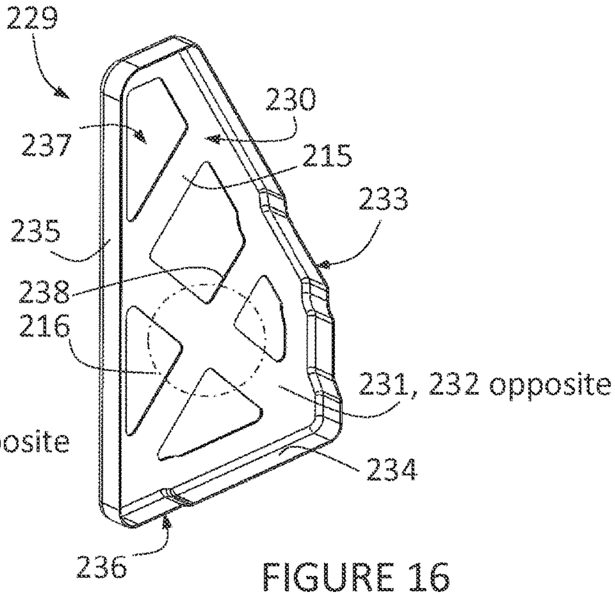
FIG. 16 depicts a perspective view of an end gusset stiffener.

FIGS. 15 and 16 depicts one embodiment of a gusset stiffener 229 (end gusset stiffener) such as those previously described as elements 128-135. The gusset stiffener 229 is in the form of a substantially triangular plate (here one end of the triangle is flattened) but could assume other profiles. It has a broad generally planar end gusset wall 230 having an end gusset rim 233 extending from the perimeter of the end gusset wall 230 in one direction. On the 'cupped' side, the end gusset wall has an outward facing inner gusset facet 231 with an opposing outer gusset facet 232 on the other side of the end gusset wall. An inner rim facet 234 is on a cupped facing side of the end gusset rim 233 with an opposing outer rim facet 235 on the other side of the end gusset rim. Inset at various locations within end gusset rim 233 are a plurality of interlock steps 236 that are configured to interface with portions of other stiffeners and shells to create a uniform surface at the intersections. An end gusset window facet 238 defines a plurality of end gusset windows 237 which here are in the form of rounded triangles and other polygons that form one or more diagonal struts 215 and cross struts 216 through the part. The end gusset stiffeners in the FIGS. 15-16 are identical in design with only the end gusset rim 233 flipped in opposite directions.

FIGS. 18-21 depict various views of one embodiment of an outer shell 108. The outer shell comprises a generally flat and broad sheet wall 250 in this case having a rectangular profile. Facing outward on the broad sheet wall is an exterior face 251 with an opposed interior face 252 facing interior. An upstanding outer shell brim 253 extends from the peripheral sides of the sheet wall 250. The outer shell brim 253 has long brims 257 on the long sides contiguous with short brims 258 on the short sides. In addition, the outer shell brim 253 has a lead brim 264 portion extending from a trail brim 265 portion with the lead brim 264 stepping inward slightly from the trail brim about the periphery of the outer shell brim. This inward step complements an overlapping fit between the lead brim and the inner shell when the inner shell 110 and outer shell 108 are assembled. Facing inside on the outer shell brim 253 is a brim inner face 255 and facing outside on the outer shell brim 253 is a brim outer face 254. At the termination of the outer shell brim is brim end face 256 that spans between the brim inner face 255 and brim outer face 254. Inset at various locations within the long brim 257 are a plurality of hinge recesses 260 having a hinge recess face 261 thereon. Extending through the hinge recess face is a plurality of hinge recess holes 262 configured to receive hinge fasteners 168 for securing the hinges 106 to the respective backup plates in FIG. 29-31. In the area of overlap between the brim outer face 254 and the outer shell 108, the hinge fasteners 168 extend through the hinge's short wing fixation holes 158, through hinge outer locator holes 189 in the outer shell, through hinge recess holes 262 in the lead brim, and then are threaded in the backup plate threaded holes 273.

Figure 32:
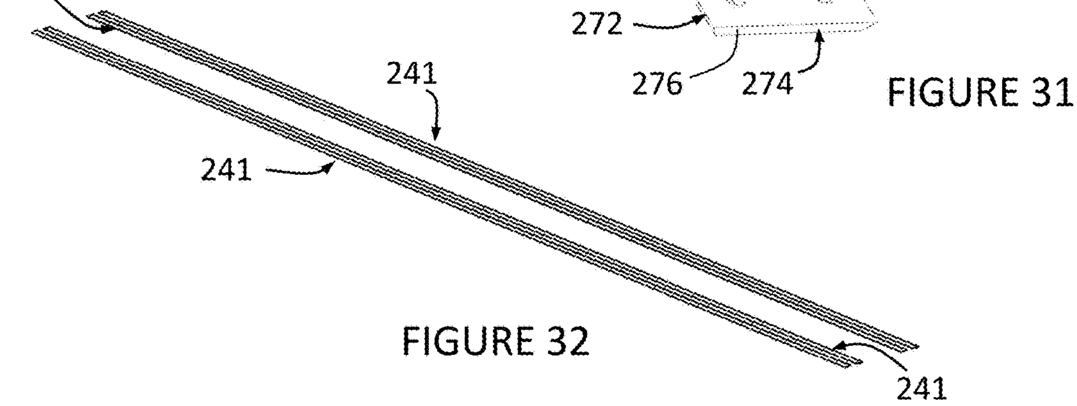
FIG. 32 depicts a perspective view of a plurality of adhesive bonding tracks.
Figure 33:
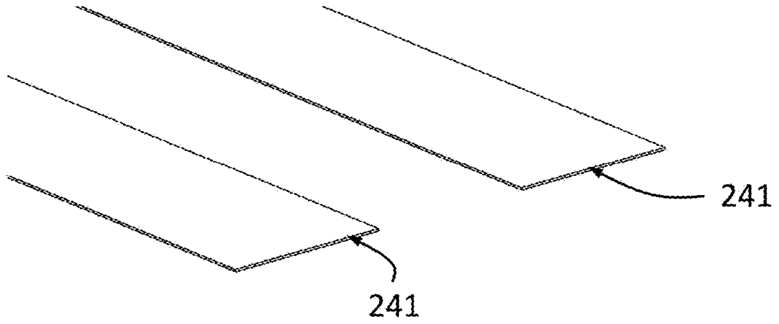
FIG. 33 depicts a closeup perspective view of the adhesive bonding tracks of FIG. 32.

FIGS. 32 and 33 depict adhesive bonding tracks 241 that are applied in this embodiment to the interior face 252 of outer shell 108 where they are aligned with the spar stiffeners. These adhesive bonding tracks securely bond the flanges of the spar stiffeners 199 to interior face 252. As noted in the Figures, there are two pairs of adhesive bonding tracks 241 spaced from each other under each spar stiffener.

This design of the overhead door assembly is approximately 10% of the weight of prior art designs for equivalent or improved performance. This results in lighter and less expensive ancillary and support equipment needed for door operation. The scalability of the overhead door assembly results in overall weight savings of tens of thousands of pounds per overhead door opening for larger applications.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A scalable overhead door assembly constructed at least in part of fiber reinforced polymers comprising in an operable mode:

a plurality of panel assemblies;

said panel assembly having a long side and a short side;

said long sides of said panel assemblies positioned adjacent each other in series;

a plurality of butterfly hinges;

said at least one of said long sides secured to an adjacent panel assembly by said plurality of butterfly hinges;

said panel assembly comprising an outer shell;

said outer shell enclosed at one said long side end by a first end cap;

said outer shell enclosed at a second long side end by a second end cap;

said panel assembly comprising an inner shell;

a plurality of spar stiffeners;

a plurality of gusset stiffeners;

said spar stiffeners extending in said internal space between said first end cap and said second end cap;

said gusset stiffeners spaced in said internal space and positioned perpendicular to said spar stiffeners;

said first end cap and said second end cap are integrally formed with said inner shell;

said inner shell and said outer shell defining an enclosed internal space when coupled together and encapsulating said spar and gusset stiffeners on all sides;

a rail system;

said rail system comprising a pair of vertically spaced rails; and wherein a portion of said butterfly hinges extends into said vertically spaced rails to guide vertical travel of said panel assemblies.

2. The scalable overhead door assembly of claim 1 wherein some of said gusset stiffeners have a generally rectangular plate profile.

3. The scalable overhead door assembly of claim 2 wherein said gusset stiffeners having said generally rectangular profile are positioned to span between said outer shell and said inner shell, and positioned to span between a pair of said spar stiffeners.

4. The scalable overhead door assembly of claim 1 wherein some of said gusset stiffeners have a generally triangular plate profile.

5. The scalable overhead door assembly of claim 1 wherein said spar stiffeners stand perpendicular to said outer shell in said internal space.

6. The scalable overhead door assembly of claim 1 wherein some of said gusset stiffeners have a generally triangular plate profile and are positioned to span between said outer shell and said inner shell, and positioned between said outer shell and one of said spar stiffeners.

7. The scalable overhead door assembly of claim 1 wherein some of said gusset stiffeners have a generally triangular plate profile and are positioned inside said internal space yet outside a space defined by opposing spar stiffeners.

8. The scalable overhead door assembly of claim 1 further comprising:

a gusset stiffener having a generally rectangular profile;

a pair of gusset stiffeners having a generally triangular profile; and wherein said generally rectangular profile gusset stiffener is positioned in the same plane and between said pair of gusset stiffeners having a generally triangular profile.

9. The scalable overhead door assembly of claim 1 further comprising:

a short wing on said butterfly hinge;

said short wing comprising a plurality of short wing fixation holes extending therethrough for receiving fasteners;

a long wing on said butterfly hinge;

said long wing comprising a plurality of long wing fixation holes extending therethrough for receiving fasteners;

wherein a said short wing and a said long wing from each butterfly hinge are fixed to said inner shell of at least one of said panel assemblies.

10. The scalable overhead door assembly of claim 9 further comprising:

hinge fasteners; and wherein said hinge fasteners extend through said short wing and through a portion of said outer shell and said inner shell.

11. The scalable overhead door assembly of claim 1 wherein said inner shell comprises a hinge pocket in the form of a depression in said inner shell for seating a pivoting portion of said butterfly hinge therein.

12. The scalable overhead door assembly of claim 1 wherein at least one of said butterfly hinges is aligned in the same plane as said gusset stiffeners.

13. The scalable overhead door assembly of claim 1 wherein said spar stiffeners have a generally C-shaped profile and wherein a pair of spar stiffeners are aligned and coupled adjacent each other forming an 'I' shaped spar stiffener pair profile.

14. The scalable overhead door assembly of claim 1 further comprising:

an interlock step at the periphery of said gusset stiffener;

an adhesive bonding track;

said adhesive bonding track positioned between said outer shell and said interlock step to bond said gusset stiffeners to said outer shell.

15. The scalable overhead door assembly of claim 1 further comprising:

an interlock step at the periphery of said gusset stiffener;

adhesive bonding tracks;

said adhesive bonding tracks positioned between said inner shell and said interlock step to bond said gusset stiffeners to said inner shell.

16. The scalable overhead door assembly of claim 1 further comprising:

a plurality of gusset stiffeners;

said gusset stiffeners comprising a substantially flat gusset wall;

a plurality of gusset windows;

said plurality of gusset windows extending through said gusset wall.

17. The scalable overhead door assembly of claim 1 further comprising:

a plurality of gusset stiffeners;

said gusset stiffeners comprising a gusset wall;

a plurality of gusset windows;

wherein said gusset stiffeners comprise at least one cross strut formed between said gusset windows.

18. The scalable overhead door assembly of claim 1 further comprising:

a plurality of gusset stiffeners;

said gusset stiffeners comprising a gusset wall;

a gusset rim extending perpendicular to said gusset wall in one direction around the periphery of said gusset wall.

19. The scalable overhead door assembly of claim 1 further comprising:

said outer shell defined by a substantially flat rectangular sheet wall;

an outer shell brim; and, said outer shell brim extending generally perpendicular from peripheral edges of said rectangular sheet wall.

20. The scalable overhead door assembly of claim 1 further comprising:

said butterfly hinges comprising wings;

a plurality of backup plates;

said backup plates comprising threaded holes; and, wherein portions of said inner shell and said outer shell are secured between said wings and said backup plates.

* * * * *